(12) United States Patent
Gouache et al.

(10) Patent No.: US 9,425,975 B2
(45) Date of Patent: Aug. 23, 2016

(54) MULTICAST TRANSMISSION USING A UNICAST PROTOCOL

(71) Applicant: THOMSON LICENSING, Issy de Moulineaux (FR)

(72) Inventors: Stéphane Gouache, Cesson Sevigne (FR); Guillaume Bichot, La Chapelle Chaussee (FR); Zhenyu Wu, Plainsboro, NJ (US)

(73) Assignee: Thomson Licensing, Issy-les-Moulineaux (FR)

( * ) Notice: Subject to any disclaimer, the term of this patent is extended or adjusted under 35 U.S.C. 154(b) by 111 days.

(21) Appl. No.: 13/938,459

(22) Filed: Jul. 10, 2013

(65) Prior Publication Data

US 2014/0016532 A1 Jan. 16, 2014

(30) Foreign Application Priority Data

Jul. 12, 2012 (EP) .................................... 12305835

(51) Int. Cl.
*H04H 20/71* (2008.01)
*H04L 12/18* (2006.01)

(52) U.S. Cl.
CPC .............. *H04L 12/189* (2013.01); *H04L 12/18* (2013.01); *H04L 12/1877* (2013.01)

(58) Field of Classification Search
None
See application file for complete search history.

(56) References Cited

U.S. PATENT DOCUMENTS 7,849,211 B2 12/2010 Bestler
8,654,815 B1 * 2/2014 Forenza et al. ............... 375/141
2010/0008280 A1 1/2010 Ornbo et al.
2010/0009685 A1 * 1/2010 Rysgaard ................ H04L 12/18 455/446
2011/0110286 A1 * 5/2011 Lu et al. ........................ 370/312
2012/0155313 A1 * 6/2012 Hirano et al. ................. 370/252
2012/0243459 A1 * 9/2012 Wu ....................... H04L 1/1607 370/312

FOREIGN PATENT DOCUMENTS

WO    WO-2011071474    6/2011

OTHER PUBLICATIONS

Fu, et al. "General Intenet Signaling Transport (GIST) over Stream Control Transmission Protocol (SCTP) and Datagram Transport Layer Security (DTLS)," Internet Society, No. 11, Apr. 28, 2010, pp. 1-11.
Yong, F. Chee, W., Ramadass, S., "M-SCTP: transport layer multicasting protocol," Proceedings of the National Computer Science Postgraduate Colloquium, 2005, pp. 1-4.
European Search Report dated Jan. 14, 2013.
Baek et al., "A Lightweight SCTP for Partially Reliable Overlay Video Multicast Service for Mobile Terminals", IEEE Transactions on Multimedia, vol. 12, No. 7, Nov. 2010, pp. 754-766.
Liu et al., "Exploiting Multi-link SCTP for Live TV Broadcasting Service", 978-1-4244-2519-8/10/$26.00 IEEE Copyright 2010.
Liu et al., "Implementing Overlay Multicast with SCTP", 978-1-4244-3709-2/10/$25.00 IEEE Copyright 2010.
Stewart et al., "Stream Control Transmission Protocol (SCTP) Partial Reliability Extension", May 2004.
Stewart et al., "Stream Control Transmission Protocol", Sep. 2007.

\* cited by examiner

*Primary Examiner* — Minh-Trang Nguyen
(74) *Attorney, Agent, or Firm* — Myers Wolin LLC

(57) ABSTRACT

Method for multicast transmission between a server and at least one of a plurality of clients using a unicast protocol, said method comprising a step of providing by the server to the client information permitting to said client to communicate with the server over a multicast path, in order to enable a joint operation of multicast and unicast paths between the server and the client.

21 Claims, 1 Drawing Sheet

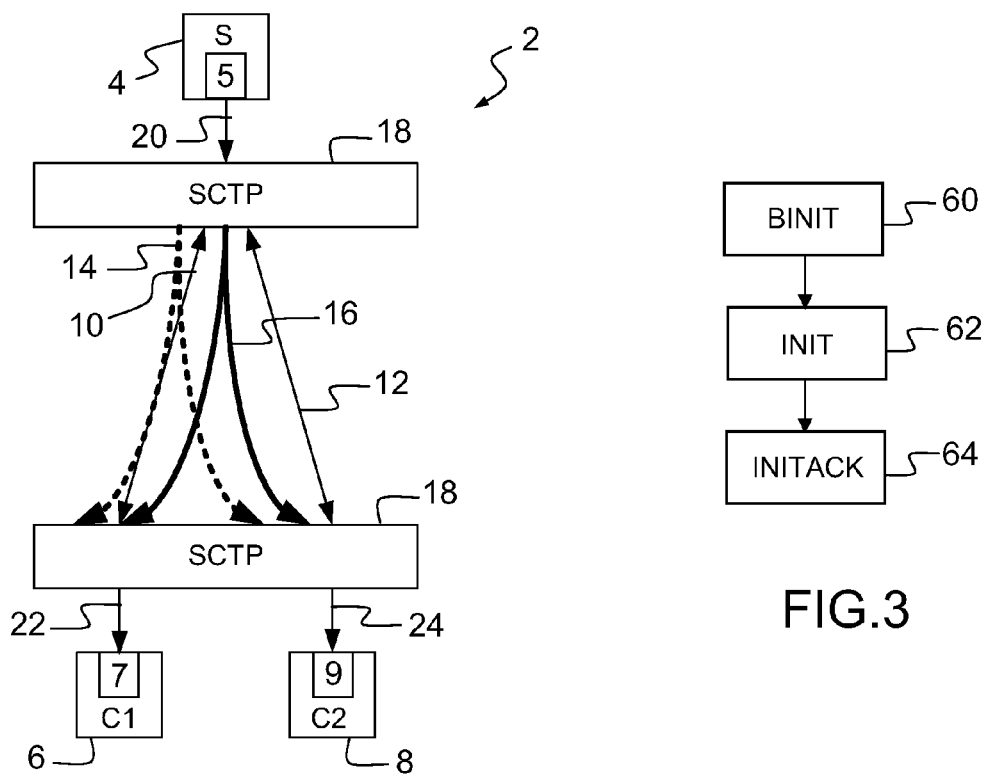
FIG.1
FIG.3
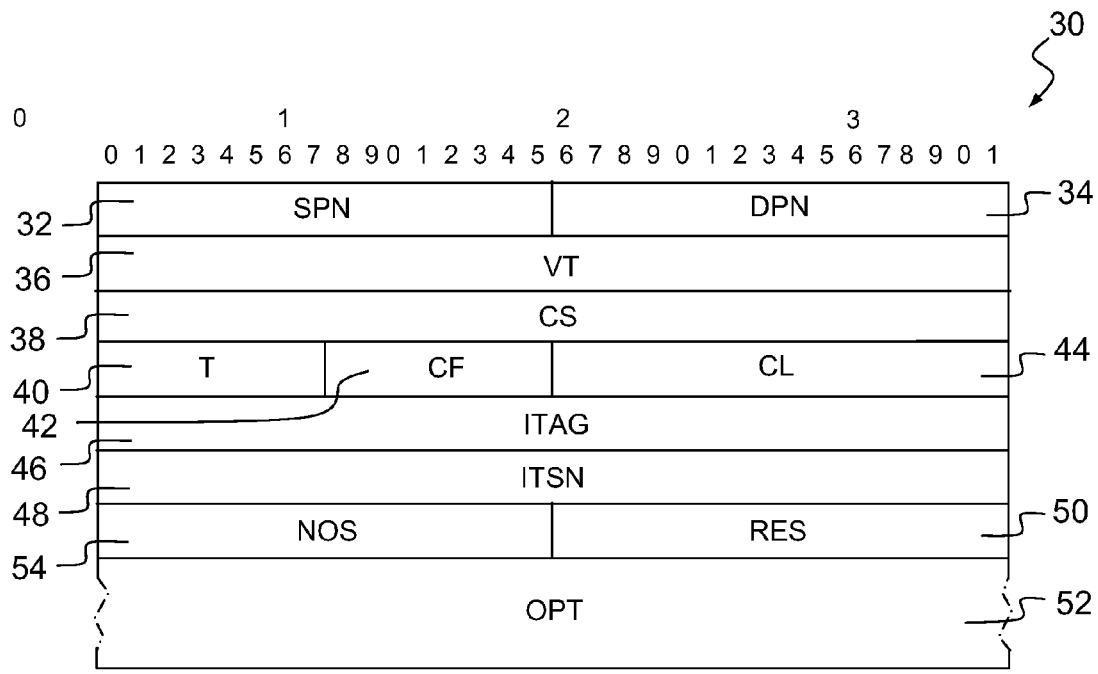
FIG.2

MULTICAST TRANSMISSION USING A UNICAST PROTOCOL

This application claims the benefit, under 35 U.S.C. §119 of European Application 12305835.6, filed 12 Jul. 2012.

FIELD OF THE INVENTION

The present invention generally relates to the field of transport layer protocols used for transporting information within a network.

More particularly, the invention deals with the Stream Control Transport Protocol, known as SCTP, which is standardized by the Internet Engineering Task Force (IETF) in IETF RFC 4960.

Thus, the invention concerns a method, a client and a server for multicast transmission using a unicast protocol. It also concerns a computer program implementing the method of the invention.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

The Stream Control Transmission Protocol (SCTP) is a general-purpose transport layer protocol providing a service similar to TCP (Transmission Control Protocol) plus a set of advanced features to use the enhanced capabilities of modern IP (Internet Protocol) networks and to support increased application requirements. Nowadays, there are SCTP implementations for all major operating systems.

The SCTP protocol, as specified by the IETF, is used in 3GPP (3rd Generation Partnership Project) for transporting signalling information within a cellular core network. SCTP was designed to address certain limitations inherent to TCP for the transport of signalling for telephony over IP. One of the main design goals of SCTP was the efficient transport of small messages in a network fault-tolerant way, important for transporting signalling messages. Thus, SCTP provides a reliable data transmission service for the transport of service messages to applications users.

SCTP is a connection-oriented general-purpose transport protocol that preserves message boundaries. An SCTP connection, called an SCTP association, can be used on top of IPv4 and IPv6.

The messages are encapsulated in data structures called chunks. The chunks are themselves encapsulated in SCTP packets. Moreover, SCTP incorporates several new features that are not available in TCP.

One of the most important enhancements provided by SCTP over traditional transport layer protocols is multihoming. This multihoming feature allows an SCTP association to use several source and destination addresses. Then, each node can be accessed by several addresses set at the establishment of the association. The addresses of transport are exchanged during the initialization of an SCTP association.

The multihoming feature was used up to now as a way to provide reliability. Whenever a primary path between a source and a destination fails, the SCTP association remains as traffic can continue to flow over one of the secondary paths.

Recently it has been proposed to use concurrently the different available connection paths allowed by SCTP in such a way that the overall bandwidth is increased, inherently enhancing mobility management.

Besides the above described default TCP like behaviour, SCTP supports also non acknowledged traffic, UDP (User Datagram Protocol) like, in an extension named SCTP-PR (SCTP-Partial reliability) specified in RFC 3758.

In an article by F. Yong, W. Chee and S. Ramadass, entitled "M-SCTP: transport layer multicasting protocol," in National Computer Science Postgraduate Colloquium (NaCSPC), 2005, a scheme that utilizes multicast SCTP (M-SCTP) is described. The scheme adds an M-SCTP server stack between an SCTP server and its SCTP clients. The server stack manages the resources of a multicast service and controls multicast membership. However, the scheme achieves multicast capability by using recursive unicast protocol message transmissions. In other words, multicast is realized by the server stack by duplicating data packets and sending them to each client individually using multiple unicast protocol message transmissions. Thus, the scheme does not solve problems stemming from low bandwidth efficiency or poor system scalability.

The document WO2011/071474 evokes the advantages of a scheme allowing the adding of a multicast support to SCTP.

The idea is to operate the SCTP transport protocol in a multicast environment whereas, as explained in the previous paragraphs, SCTP has been primarily designed for unicast TCP/UDP like connections.

There are numerous cases, and in particular when considering video distribution, where it is interesting to beneficiate from multicasting and/or broadcasting. However, it is common to associate with a broadcast medium, a bi-directional medium for robustness, service continuity, etc. Today, it is up to the application to deal with different media and their characteristics such as unicast or multicast.

The prior art, consisting only in multicast over UDP, addresses the case of a source, as a streaming server for example, distributing a stream to multiple destinations over a shared communication link but does not permit concurrent use of multiple links to achieve distribution of such multicast content.

The above cited document WO2011/071474 does not provide the changes to the SCTP protocol to achieve such a multicast transmission.

SUMMARY OF THE INVENTION

The present invention proposes a solution for improving the situation.

Accordingly, the present invention provides a method for multicast transmission between a server and at least one of a plurality of clients using a unicast protocol, said method comprising a step of providing by the server to the client information permitting to said client to communicate with the server over a multicast path, in order to enable a joint operation of multicast and unicast paths between the server and the client.

By providing from the server to the client information permitting to said client to communicate with the server over a multicast path, the method of the present invention enables to use both unicast and multicast paths jointly or alternatively.

Advantageously, the unicast protocol is a multihoming protocol.

Preferably, the multihoming protocol is the Stream Control Transmission Protocol, SCTP, or an extension of SCTP.

An example of such extension of SCTP is SCTP-PR.

Advantageously, in the case of SCTP, the information permitting to the client to communicate with the server over the multicast path comprise initialization information permitting to initialize an SCTP association.

With the present invention, it is then possible to design a multicast SCTP service where concurrent IP multicast bearers associated with IP unicast bearers are used.

According to a first embodiment, the initialization information is carried in an initialization chunk broadcast over the multicast path regularly.

Advantageously, the initialization chunk comprises a field advertising a number of outbound streams carried by the SCTP association.

Advantageously, the initialization chunk comprises at least one IP address supported by the server.

More particularly, the broadcast initialization chunk comprises a set of IPv4/IPv6 addresses by which the server may be contacted. These addresses may include other possible multicast bearers.

According to a second embodiment, the initialization information are described in a file made available to the client.

For example, such a file may be a SDP file made available to the client by any possible means, for example as part of a service guide or may be pre-loaded by a network operator.

Advantageously, the method comprises a step, carried by the client, of initialization of an SCTP association.

This is possible when an uplink path between the client and the server is available.

The invention further provides a server able to communicate with at least one of a plurality of clients using a unicast protocol, said server comprising a management module for providing to the client information permitting to said client to communicate with the server over a multicast path, in order to enable a joint operation of multicast and unicast paths between the server and the client.

The present invention also provides a client able to communicate with a server using a unicast protocol, said client comprising a receiver module for receiving information permitting to said client to communicate with the server over a multicast path, in order to enable a joint operation of multicast and unicast paths between the server and the client.

The method for multicast transmission according to the invention may be implemented in software on a programmable apparatus. It may be implemented solely in hardware or in software, or in a combination thereof.

Since the present invention can be implemented in software, the present invention can be embodied as computer readable code for provision to a programmable apparatus on any suitable carrier medium. A carrier medium may comprise a storage medium such as a floppy disk, a CD-ROM, a hard disk drive, a magnetic tape device or a solid state memory device and the like.

The invention thus provides a computer-readable program comprising computer-executable instructions to enable a computer to perform the steps of the method of the invention. The diagram of FIG. 3 illustrates an example of the general algorithm for such computer program.

BRIEF DESCRIPTION OF THE DRAWINGS

The present invention is illustrated by way of examples, and not by way of limitation, in the figures of the accompanying drawings, in which like reference numerals refer to similar elements and in which:

FIG. 1 is a schematic view of an embodiment of a transmission system using SCTP and implementing the method of multicast transmission according to an embodiment of the present invention;

FIG. 2 is an example of an initialization chunk according to an embodiment of the present invention; and FIG. 3 is a flowchart showing the steps of a multicast transmission method, according to an embodiment of the present invention.

DETAILED DESCRIPTION OF PREFERRED EMBODIMENTS

Referring to FIG. 1, there is shown therein a schematic view of a transmission system 2 using a multihoming unicast protocol, more particularly SCTP, according to an embodiment of the invention.

The transmission system 2 comprises a server 4, containing an SCTP management module 5, a first client 6 and a second client 8, containing receiver modules 7,9, respectively. Although FIG. 1 depicts two clients, the system 2 is not limited to operation with two clients and may support from one to a plurality of clients.

The server 4 includes a storage medium comprising content to be delivered to the client 6, 8. Advantageously the server 4 maintains client state or profile information allowing it to track client devices characteristics, such as, for instance, playback capability, screen resolution, and whether the client 6, 8 has established a unicast connection in addition to the multicast connection. Accordingly, this state information can be used to selectively add targeted content for some of the clients, as for example a different sound track or an enhanced quality.

Each individual client 6, 8 may include several IP addresses used for exchanging data packets with the server 4. The IP addresses of an individual client are used to create communication paths with IP addresses of the server 4 to facilitate the exchange of data packets between an individual client 6, 8 and the server 4. The server 4 may also form communication paths with the individual clients 6, 8 through multiple access networks.

For example, as shown in FIG. 1, the server 4 can communicate with the clients 6, 8 through unicast access paths 10, 12, respectively, which correspond, for instance, to a $3^{rd}$ generation partnership project (3GPP) Unicast network.

According to the present invention, the server 4 can also communicate with the clients 6, 8 through multicast access paths 14, 16, which correspond, for instance, to a 3GPP Multimedia Broadcast and Multicast Services (MBMS) network and a Digital Video Broadcasting-Handheld (DVB-H) network, respectively.

An SCTP protocol stack 18 residing in the server 4 handles the multicast association between the server 4 and the clients 6, 8, registering new client addresses whenever the clients add their unicast addresses to the association. It sends data chunks to the clients 6, 8 over the multicast connection and uses unicast connections towards individual clients 6, 8 to deliver data selectively or retransmit data when explicitly requested by the clients 6, 8.

Although FIG. 1 depicts three access networks, the system is not limited to operation with three access networks and may support connection paths between the server 4 and one to a plurality of access networks supporting either unicast or multicast data transmission.

The unicast paths 10, 12 provide unicast communication support capability with bi-directional uplinks and downlinks between server 4 and each respective client 6, 8.

The multicast paths 14, 16 only support uni-directional downlinks. As a result, no feedback channels from a respective client 6, 8 to the server 4 are available through multicast paths 14, 16.

The clients 6, 8 may also have multiple network interfaces and be able to connect with a remote system via different types of communication networks. Specifically, the clients 6, 8 may connect to a remote system through all three of the aforementioned access networks and thus have both unicast bi-directional and multicast uni-directional links.

Each client 6, 8 may be a hardware device, for example, a computer or a mobile device capable of processing data files, running applications, and communicating with the server for instructions on transmitting, receiving and processing of data.

The clients 6, 8 may require content from the server 4 in order to be able to perform a specific function. For example, the client 6, 8 may be an audio/video device that must receive specific data from the server 4 in order to properly process and display the data for a user. Thus, associations between the clients 6, 8 and the server 4 are required in order to facilitate transmission of data.

According to the present invention, a hybrid multicast/unicast transmission is handled by the SCTP layer, i.e. the SCTP protocol stack 18.

Interfaces 20, 22, 24, consisting for instance in slightly enhanced socket Application Programming Interfaces (API) are used on the server 4, the client 6 and the client 8 sides, respectively to read out and modify the association parameters. The enhanced socket API 20, 22, 24 allow reading a list of clients having established a unicast connection.

The association between the server 4 and the client 6, 8 is either initiated by the server 4 through its multilink side or by the client 6, 8 through the uplink path 10, 12.

A SCTP association is initiated through a conventional four ways handshake. Of course, this connection set-up can only be used by a client when an uplink path, as paths 10, 12, is available.

According to a first embodiment of the present invention, this association uses an initialization chunk called BINIT different from the INIT chunk defined in RFC 4960. This chunk is broadcast over the multicast path 14, 16 regularly and advertises the number of outbound streams carried by the SCTP association.

An example of an initialization chunk BINIT 30 of the present invention is shown in FIG. 2.

The BINIT chunk comprises the following conventional fields of the INIT chunk of an SCTP association:

Source Port Number 32: this field identifies the SCTP sender's port number. It can be used by the receiver in combination with the source IP address, the SCTP destination port and possibly the destination IP address to identify the association to which this packet belongs;

Destination Port Number 34: this field identifies the SCTP port number to which the considered packet is destined. The receiving host will use this port number to de-multiplex the SCTP packet to the correct receiving endpoint/application;

Verification Tag 36: this field is used to validate the sender of the considered SCTP packet. In the case of a bidirectional, i.e. legacy SCTP association, the value of this Verification Tag is set to the value of the Initiate Tag received from the peer endpoint during the association initialization. According to a preferred embodiment of the invention, since the association can be initiated from the server 4 with a multicast destination without handshake with any client, this Verification Tag is set to a value randomly chosen at the start of the multicast association;

Checksum 38: this field contains the checksum of the considered SCTP packet;

Chunk Type 40: this field identifies the type of information contained in the chunk data;

Chunk Flags 42: the usage of this field depends on the Chunk Type;

Chunk Length 44: this field indicates the size of the chunk in bytes;

Initiate Tag 46: the value of this field is used by a client wishing to initiate a bidirectional connection to set the contents of the Verification Tag of their INIT chunk;

Initial TSN 48: this field indicates the Initial transmission sequence number to be used;

Reserved 50: this field is reserved for future use;

Optional/Variable-Length Parameters 52: this field contains optional parameters.

Besides, the BINIT chunk contains a new field 54, according to the first embodiment of the invention. The new field 54 contains the number of outbound streams carried by the association and is coded identically to the Number or Outbound Streams field found in the INIT chunk. Its value allows the client joining the association to know how many streams are part of the association as this information is normally not advertised any further once the association has been established.

The flowchart of FIG. 3 details the steps of the method of the invention, according to the first embodiment.

At step 60, the server 4 broadcasts the BINIT chunk 30 regularly over the multicast path 16.

In case of uplink possibility, as here with the unicast paths 10, 12, the client 6, 8 shall wait for the BINIT chunk and uses, at step 62, the Initiate tag value as the Verification tag value in an INIT chunk starting the subsequent four ways handshake. The server 4, processing the incoming INIT chunk, detects the non null Verification tag which indicates that the client is not attempting to setup a new "legacy" SCTP association. Instead, the received Verification Tag value allows the server 4 to identify the multicast SCTP association that the client wishes to join using his bidirectional path. After having processed the remainder of the four way handshake with the client, the server's SCTP protocol stack 18 will have integrated the client's IP address into the existing multicast association.

The server 10 indicates in its BINIT chunk and possible subsequent INIT ACK chunk(s), at step 64, through the optional field 52, the set of IPv4/IPv6 addresses it supports and the list of multicast addresses used on multicast paths 14, 16. The addresses are encoded as for INIT chunks as per RFC 4960.

According to a second embodiment of the invention, the characteristics of the association are described in a SDP file. This file is made available to the client 6, 8 by any possible means, for example as part of a service guide or pre-loaded by a network operator.

A different mechanism is used in case the client 6, 8 wishes to initiate an uplink connection. Indeed, the server sets the Verification Tag of all chunks sent over the multicast link to a fixed value which is chosen here upon initialization of the association by the server. The client 6, 8 sends an INIT chunk with the Verification Tag set to the value of the Verification Tag found in the chunks received over the multicast link 16. This indicates to the server 4 that the client 6, 8 wishes to add this unicast link to the existing association and not to initiate a new association. The Initiate Tag is set to a value chosen by the client 6, 8 as in the conventional SCTP handshake. The server 4 replies with an INIT ACK chunk with the Verification Tag set to the value of the Initiate Tag provided by the client 6, 8.

From the server 4 viewpoint, the application opens a one to many SCTP socket. However, when creating the socket, the SOCK_DGRAM type is used instead of the conventional SOCK_SEQPACKET. This indicates the de facto non connected nature of the underlying connection. This indicates also to the SCTP protocol stack 18 that potential point-to-point associations might be set-up.

The server 4 application then uses the normal socket API call to send data.

It is then up to the SCTP protocol stack 18 to generate the BINIT chunks and start distributing traffic over the multicast paths 14, 16.

From the client 6, 8 viewpoint, the application creates a one to many SCTP socket as well with the SOCK_DGRAM type. The client 6, 8 programming model looks like a conventional multicast receiver. It calls the standard setsockopt function from the socket API with IP_ADD_MEMBERSHIP option for handling IGMP. Then, the client 6, 8 binds the socket with a particular multicast capable interface and waits incoming packets.

It is then up to the SCTP protocol stack 18 to listen the corresponding multicast traffic and to create a new unicast association with the source SCTP end point if possible.

From the client 6, 8 viewpoint, the traffic is read from the SCTP socket as with a normal socket. Having an additional uplink gives the possibility to the SCTP socket to request the retransmission of missing packets transparently for the client 6, 8.

In the specific use case of FIG. 1, where more than one multicast distribution mechanism exist, as for example DVB-H and MBMS, it is possible to add a multicast path a posteriori through the socket API.

Remarkably, the invention integrates downstream multicast distribution and optional bi-directional unicast links at the transport layer. Legacy applications leveraging multicast UDP can be reused with almost no modifications. Large numbers of clients can receive a multicast stream without flooding the distribution network because replication of the data is avoided when multicast is supported by the network. Additional bi-directional unicast links can be established by the clients, transparently for the applications, that can be used to enhance user experience due to additional bandwidth, or to guarantee service continuity in areas where multicast is not available due to the network coverage.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention includes all embodiments falling within the scope of the appended claims.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed to be a reference to the plural and vice versa.

A person skilled in the art will readily appreciate that various parameters disclosed in the description may be modified and that various embodiments disclosed and/or claimed may be combined without departing from the scope of the invention.

The invention claimed is:

1. A method comprising:
transmitting, by a server, information permitting communication with the server over a multicast path, in order to enable a joint operation of multicast and unicast paths in a multicast association over a network at a transport layer using a unicast protocol, said information comprising an identifier of said multicast association; and
receiving, by said server, a first chunk of a four way handshake, said first chunk comprising said identifier of said multicast association.

2. The method of claim 1, wherein the unicast protocol is a multihoming protocol.

3. The method of claim 2, wherein the multihoming protocol is the Stream Control Transmission Protocol, SCTP, or an extension of SCTP.

4. The method of claim 3, wherein the information permitting communication with the server over the multicast path further comprises initialization information permitting initialization of an SCTP association.

5. The method of claim 4, wherein the initialization information is carried in an initialization chunk broadcast over the multicast path regularly.

6. The method of claim 5, wherein the initialization chunk comprises a field advertising a number of outbound streams carried by the SCTP association.

7. The method of claim 5, wherein the initialization chunk comprises at least one IP address supported by the server.

8. The method of claim 4, wherein the initialization information is described in a file made available by the server.

9. A server able to communicate using a unicast protocol, said server comprising:
a memory;
at least one processor configured to:
transmit information permitting communication with the server over a multicast path, in order to enable a joint operation of multicast and unicast paths in a multicast association over a network at a transport layer using the unicast protocol, said information comprising an identifier of said multicast association; and
receive a first chunk of a four way handshake, said first chunk comprising said identifier of said multicast association.

10. A client able to communicate using a unicast protocol, said client comprising:
a memory;
at least one processor configured to:
receive information permitting said client to communicate over a multicast path, in order to enable a joint operation of multicast and unicast paths in a multicast association over a network at a transport layer using the unicast protocol, said information comprising an identifier of said multicast association; and
transmit a first chunk of a four way handshake, said first chunk comprising said identifier of said multicast association.

11. The client of claim 10, wherein the unicast protocol is the Stream Control Transmission Protocol, SCTP, or an extension of SCTP and the information permitting the client to communicate over the multicast path further comprises initialization information permitting initialization of an SCTP association.

12. A non-transitory computer-readable medium with computer-executable instructions stored therein which upon execution instruct a computer to:
  transmit information permitting communication over a multicast path, in order to enable a joint operation of multicast and unicast paths in a multicast association over a network at a transport layer using a unicast protocol, said information comprising an identifier of said multicast association; and
  receive a first chunk of a four way handshake, said first chunk comprising said identifier of said multicast association.

13. A method to communicate using a unicast protocol, said method comprising:
  receiving information permitting communication over a multicast path at a transport layer to enable a joint operation of multicast and unicast paths in a multicast association over a network at a transport layer, using the unicast protocol, said information comprising an identifier of said multicast association; and
  transmitting a first chunk of a four way handshake, said first chunk comprising said identifier of said multicast association.

14. The method of claim 13, wherein the unicast protocol is the Stream Control Transmission Protocol, SCTP, or an extension of SCTP and the information permitting communication over the multicast path further comprises initialization information permitting initialization of an SCTP association.

15. The server of claim 9, wherein the unicast protocol is a multihoming protocol.

16. The server of claim 15, wherein the multihoming protocol is the Stream Control Transmission Protocol, SCTP, or an extension of SCTP.

17. The server of claim 16, wherein the information permitting communication with the server over the multicast path further comprises initialization information permitting initialization of an SCTP association.

18. The server of claim 17, wherein the initialization information is carried in an initialization chunk broadcast over the multicast path regularly.

19. The server of claim 18, wherein the initialization chunk comprises a field advertising a number of outbound streams carried by the SCTP association.

20. The server of claim 18, wherein the initialization chunk comprises at least one IP address supported by the server.

21. The server of claim 17, wherein the initialization information is described in a file made available by the server.

* * * * *